(12) United States Patent
Do et al.

(10) Patent No.: US 10,073,297 B2
(45) Date of Patent: Sep. 11, 2018

(54) LIQUID CRYSTAL DISPLAY HAVING A NARROW VIEWING MODE

(71) Applicant: SAMSUNG DISPLAY CO., LTD., Yongin, Gyeonggi-do (KR)

(72) Inventors: Hee Wook Do, Cheonan-si (KR); Seon-Ah Cho, Busan (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 600 days.

(21) Appl. No.: 14/682,796

(22) Filed: Apr. 9, 2015

(65) Prior Publication Data

US 2015/0346532 A1    Dec. 3, 2015

(30) Foreign Application Priority Data

May 28, 2014 (KR) .................. 10-2014-0064576

(51) Int. Cl.
*G02F 1/13363* (2006.01)
*G02F 1/1335* (2006.01)

(52) U.S. Cl.
CPC .... *G02F 1/13363* (2013.01); *G02F 1/133528* (2013.01); *G02F 2001/133531* (2013.01); *G02F 2413/08* (2013.01)

(58) Field of Classification Search
None
See application file for complete search history.

(56) References Cited

U.S. PATENT DOCUMENTS

| | | | |
|---|---|---|---|
| 8,096,667 B2 | 1/2012 | Boyd et al. | |
| 8,698,989 B2 | 4/2014 | Sugiura et al. | |
| 2009/0117293 A1* | 5/2009 | Shin | G02B 5/305 428/1.2 |
| 2009/0167999 A1* | 7/2009 | Ohmori | C08J 5/18 349/117 |
| 2010/0149459 A1* | 6/2010 | Yabuta | G02F 1/133528 349/74 |
| 2011/0025962 A1* | 2/2011 | Sakai | G02F 1/133634 349/117 |
| 2013/0108807 A1* | 5/2013 | Sato | G02B 5/305 428/1.33 |

FOREIGN PATENT DOCUMENTS

| | | |
|---|---|---|
| JP | 2006-309956 | 11/2006 |
| JP | 5043019 | 10/2012 |
| KR | 10-2008-0001192 | 1/2008 |
| KR | 10-2011-0029934 | 3/2011 |
| KR | 10-2012-0125808 | 11/2012 |

* cited by examiner

*Primary Examiner* — Dennis Y Kim
(74) *Attorney, Agent, or Firm* — F. Chau & Associates, LLC

(57) ABSTRACT

A liquid crystal display includes a liquid crystal display panel having a first substrate and a second substrate. An upper polarizer is disposed on an outer surface of the first substrate. A viewing angle control film is disposed on the upper polarizer. The viewing angle control film includes a polarizing layer having a transmission axis substantially parallel to a transmission axis of the upper polarizer and a phase retardation layer including a birefringence material having an optical axis with a poloidal angle of about 40 degrees to about 75 degrees.

18 Claims, 5 Drawing Sheets

LIQUID CRYSTAL DISPLAY HAVING A NARROW VIEWING MODE

CROSS-REFERENCE TO RELATED APPLICATION

This U.S. non-provisional patent application claims priority under 35 U.S.C. §119 to Korean Patent Application No. 10-2014-0064576, filed on May 28, 2014, the contents of which are hereby incorporated by reference in its entirety.

TECHNICAL FIELD

The present disclosure relates to a liquid crystal display. More particularly, the present disclosure relates to a liquid crystal display operated in a narrow viewing angle mode.

DISCUSSION OF THE RELATED ART

A viewing angle represents the angle from which a display panel, such as a liquid crystal display, may be clearly viewed. A wide viewing angle is often desired to allow a user to see an image on the screen at various angles or positions. Liquid crystal display having wide viewing angles may display a clear image from even shallow angles without distortion in image quality.

A narrow viewing angle may be desirable where a viewer wishes to make it more difficult for people besides the viewer to see the contents being displayed on the display device. Thus, display devices may be equipped with a narrow viewing angle mode.

The narrow viewing angle mode may be used to ensure that confidential information displayed on the display device is not observable by other people. However, existing approaches for enabling a narrow viewing angle mode may reduce light transmittance even within the narrow angle in which the primary viewer views the display device.

SUMMARY

The present disclosure provides a liquid crystal display operated in a narrow viewing angle mode.

Embodiments of the inventive concept provide a liquid crystal display including a liquid crystal display panel that includes a first substrate and a second substrate. An upper polarizer is disposed on an outer surface of the first substrate. A viewing angle control film is disposed on the upper polarizer. The viewing angle control film includes a polarizing layer having a transmission axis substantially in parallel to a transmission axis of the upper polarizer and a phase retardation layer including a birefringence material having an optical axis with a poloidal angle of about 40 degrees to about 75 degrees.

Embodiments of the inventive concept provide a liquid crystal display including a liquid crystal display panel that includes a first substrate and a second substrate. A stacked film is disposed on an outer surface of the first substrate. The stacked film includes a first polarizer, a phase retardation layer disposed on the first polarizer and including a birefringence material having an optical axis with a poloidal angle of about 40 degrees to about 75 degrees, and a second polarizer disposed on the phase retardation layer and having a transmission axis substantially in parallel to a transmission axis of the first polarizer.

According to the above, the viewing angle control film is realized using an O-plate, which may be a plate for changing an optical axis, and thus the light transmittance may be prevented from being lowered in the narrow viewing angle mode.

In addition, when the viewing angle control film is manufactured by using the O-plate, the thickness of the viewing angle control film may be reduced. Further, since a patterning process of forming a light absorbing pattern is omitted, the manufacturing process of the liquid crystal display may be simplified.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present. Like numbers may refer to like elements throughout the specification and figures.

It will be understood that, although the terms first, second, etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the present invention.

Hereinafter, the present invention will be explained in detail with reference to the accompanying drawings.

Figure 1:
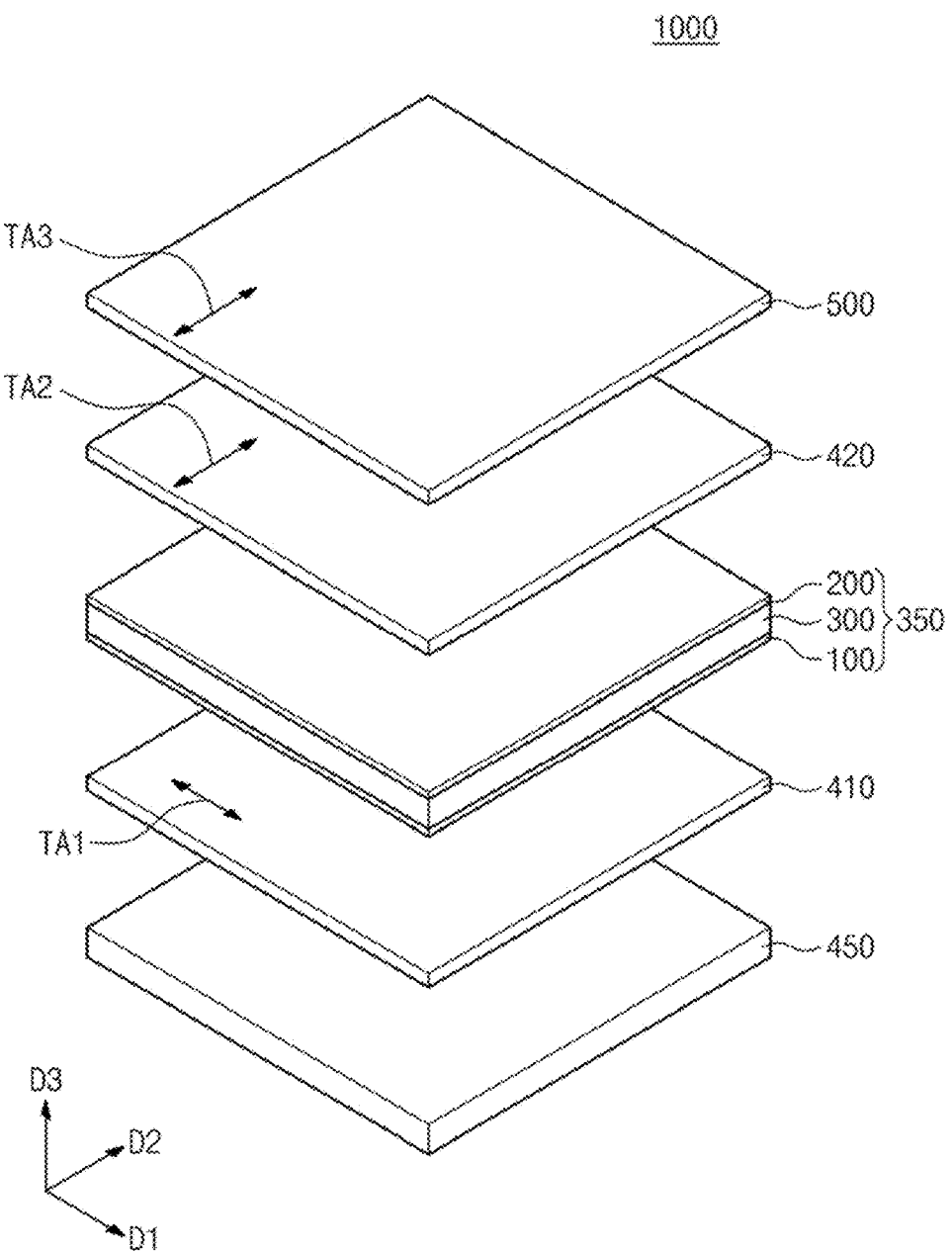
FIG. 1 is an exploded perspective view showing a liquid crystal display according to an exemplary embodiment of the present disclosure.

FIG. 1 is an exploded perspective view showing a liquid crystal display 1000 according to an exemplary embodiment of the present disclosure.

Referring to FIG. 1, the liquid crystal display 1000 includes a liquid crystal display panel 350 controlling a transmittance of light incident therethrough using liquid crystal. A first polarizer 410 polarizes light traveling to the liquid crystal display panel 350. A second polarizer 420 polarize light exiting from the liquid crystal display panel 350. The liquid crystal display panel 350 is disposed between the first and second polarizers 410 and 420.

The liquid crystal display 1000 further includes a backlight unit 450 to generate the light and to supply the light to the liquid crystal display panel 350. The backlight unit 450 is disposed under the first polarizer 410. Accordingly, the light generated by the backlight unit 450 sequentially transmits through the first polarizer 410, the liquid crystal display panel 350, and the second polarizer 420, and then travels to the outside of the liquid crystal display 1000.

The liquid crystal display panel 350 includes a first substrate 100, a second substrate 200 facing the first substrate 100, and a liquid crystal layer 300 interposed between the first and second substrates 100 and 200. The first substrate 100 is disposed adjacent to the first polarizer 410 and the second substrate 200 is disposed adjacent to the second polarizer 420.

The liquid crystal layer 300 includes a twisted nematic liquid crystal, a vertical alignment liquid crystal, or a cholesteric liquid crystal.

The first polarizer 410 has a first transmission axis TA1 substantially in parallel to a first direction D1 and a first absorbing axis substantially in parallel to a second direction D2 and substantially vertical to the first transmission axis TA1. Therefore, a component of the light incident to the first polarizer 410, which is substantially in parallel to the second direction D2, is absorbed or reflected by the first absorbing axis, and thus does not transmit through the first polarizer 410. A component of the light incident to the first polarizer 410, which is substantially in parallel to the first direction D1, transmits through the first polarizer 410. Here, the incident light may be, but is not limited to, non-polarized light. The term of "non-polarized" used herein means that a linearly polarized light component is overlapped with a circularly polarized light component in the whole direction, and the circularly polarized light component includes a left-circularly polarized light component and a right-circularly polarized light component.

The second polarizer 420 has a second transmission axis TA2 substantially in parallel to the second direction D2 and a second absorbing axis substantially in parallel to the first direction D1 and substantially vertical to the second transmission axis TA2. Thus, a component of the light incident to the second polarizer 420, which is substantially in parallel to the first direction D1, is absorbed or reflected by the second absorbing axis, and thus does not transmit through the second polarizer 420. A component of the light incident to the second polarizer 420, which is substantially in parallel to the second direction D2, transmits through the second polarizer 420.

The liquid crystal display 1000 further includes a viewing angle control film 500 disposed on the second polarizer 420.

The viewing angle control film 500 has a third transmission axis TA3 substantially in parallel to the second direction D2 and a third absorbing axis substantially vertical to the third transmission axis TA3. The viewing angle control film 500 transmits the light exiting from the second polarizer 420, which travels in a third direction D3 substantially vertical to the light traveling to the front surface of the liquid crystal display panel 350, e.g., the first and second directions D1 and D2, and blocks the light traveling to the side surface of the liquid crystal display panel. Accordingly, the viewing angle of the liquid crystal display 1000 may be limited to a specific range.

Figure 2:
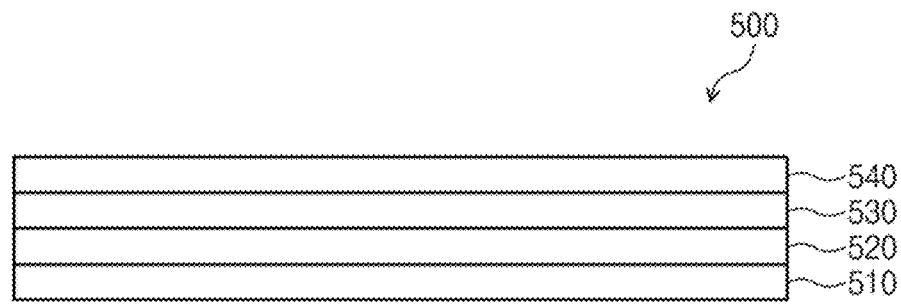
FIG. 2 is a cross-sectional view showing a viewing angle control film shown in FIG. 1.
Figure 3:
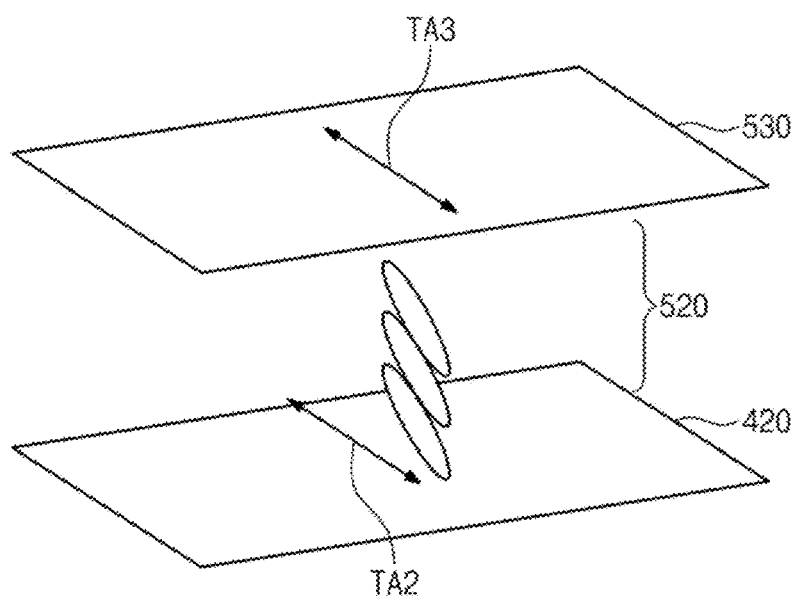
FIG. 3 is an exploded perspective view showing the viewing angle control film shown in FIG. 2.
Figure 4:
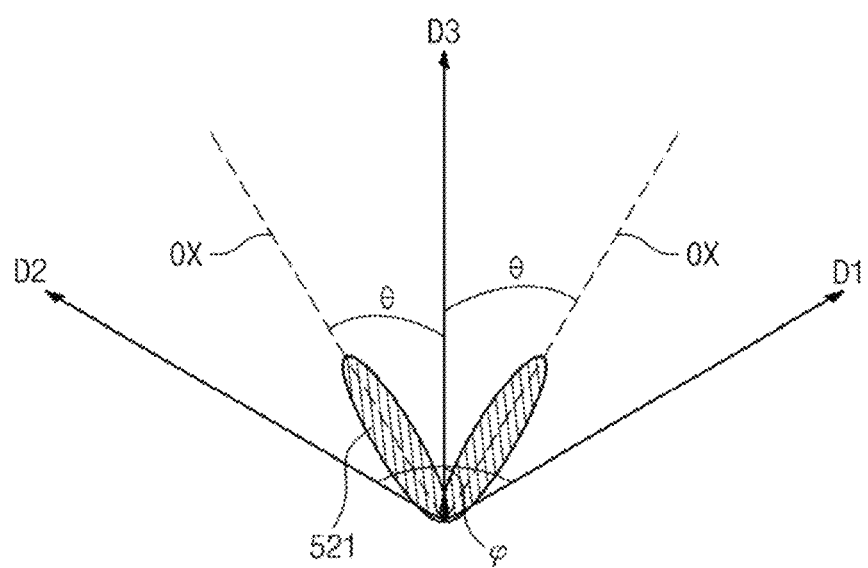
FIG. 4 is a view showing a poloidal angle and an azimuth angle of a phase retardation layer shown in FIG. 3.

FIG. 2 is a cross-sectional view showing the viewing angle control film 500 shown in FIG. 1. FIG. 3 is an exploded perspective view showing the viewing angle control film 500 shown in FIG. 2. FIG. 4 is a view showing a poloidal angle and an azimuth angle of a phase retardation layer shown in FIG. 3.

Referring to FIGS. 2 to 4, the viewing angle control film 500 includes a support layer 510, a phase retardation layer 520, and a polarizing layer 530. The support layer 510 includes a cellulose-based polymer, e.g., a triacetate cellulose (TAC).

The phase retardation layer 520 is disposed on the support layer 510 and may be, but not limited to, an O-plate that uses a birefringence material in which an optical axis OX thereof is inclined against a plane surface of the support layer 510. As a material appropriate to manufacture the O-plate, a positive short-axis birefringence crystalline material, e.g., a liquid crystal polymer material, a single crystalline material, etc., may be used.

The optical axis OX of the O-plate has an azimuth angle Φ of about 0 degrees to about 90 degrees with respect to the second transmission axis TA2 of the second polarizer 420.

When upper and lower side viewing angles of the liquid crystal display panel 350 are reduced, the optical axis OX is inclined by the azimuth angle Φ of about 0 degrees with respect to the second transmission axis TA2, and when left and right side viewing angles of the liquid crystal display panel 350 are reduced, the optical axis OX is inclined by the azimuth angle Φ of about 90 degrees with respect to the second transmission axis TA2

In addition, the optical axis OX of the O-plate has the poloidal angle θ of about 40 degrees to about 75 degrees.

The poloidal angle θ of the optical axis OX may be constant in the O-plate, but it should not be limited thereto or thereby. For example, the poloidal angle θ may be changed according to areas defined along a thickness direction, e.g., the third direction D3, of the 0-plate.

The phase retardation layer 520 has a phase retardation value (Δnd) of about 350 nm to about 1000 nm. Here, "Δn" indicates a difference value between a long-axis refractive index (ne) and a short-axis refractive index (no) in an anisotropic molecule structure and "d" indicates a thickness of the phase retardation layer 520.

As shown in FIGS. 2 and 3, the polarizing layer 530 is disposed on the phase retardation layer 520 and has the third transmission axis TA3 substantially in parallel to the second transmission axis TA2 of the second polarizer 420.

The polarizing layer 530 includes a polymer resin elongated in a particular direction. The polymer resin may be, but not limited to, a polyvinyl alcohol resin. The polyvinyl alcohol resin is obtained by, for example, saponifying polyvinyl acetate resin, e.g., a homopolymer of vinyl acetate or a copolymer obtained by copolymerizing vinyl acetate with monomer(s) that is copolymerizable with vinyl acetate. Unsaturated carboxylic acid, olefin, vinyl ether, and unsaturated sulfonic acid may be used as the monomer, which is copolymerizable with vinyl acetate.

Referring to FIG. 2 again, the viewing angle control film 500 may further include a surface treatment layer 540 disposed on the polarizing layer 530. The surface treatment layer 540 may be an anti-glare layer containing silica bead (not shown), a hard coating layer preventing the polarizing layer 530 from being damaged, or a sticking preventing layer preventing the polarizing layer 530 from being adhered to adjacent layers.

As described above, when the viewing angle control film 500 is formed using the O-plate, the light transmittance of the liquid crystal display 1000 may be prevented from being lowered in the narrow viewing angle mode since a light absorbent member does not need to be used.

In addition, when the viewing angle control film 500 is formed using the O-plate, the thickness of the viewing angle control film 500 may be reduced. Further, a patterning process used to form a light absorbing pattern is omitted, and thus the manufacturing process of the liquid crystal display 1000 is simplified.

Figure 5A:
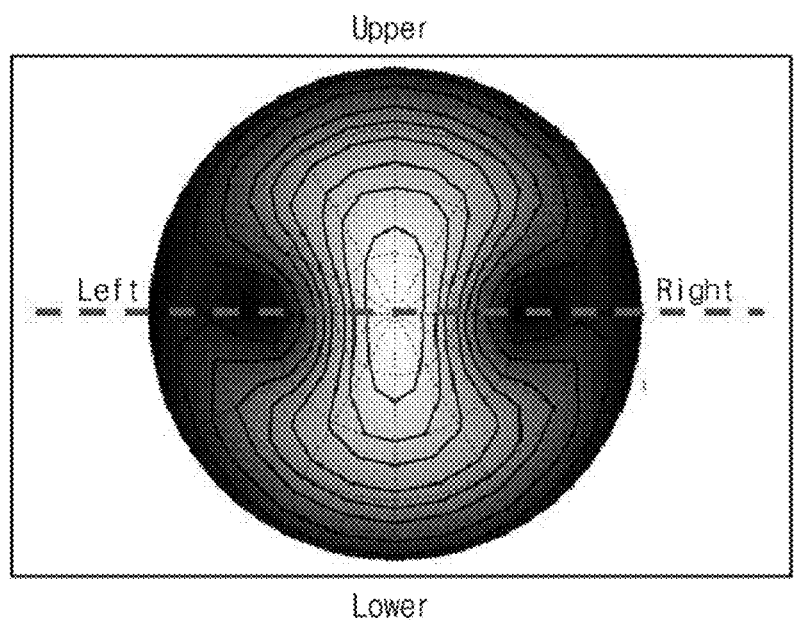
FIG. 5A is a graph showing a transmittance as a function of a viewing angle.
Figure 5B:
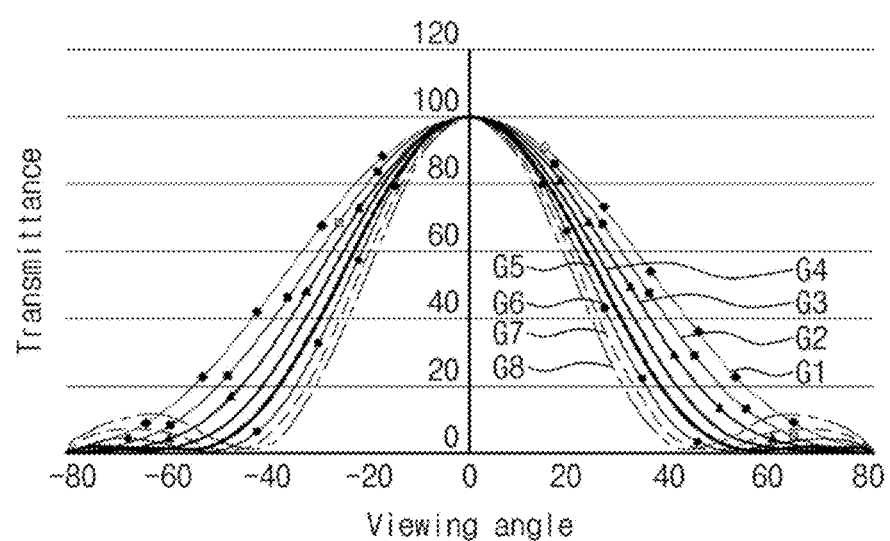
FIG. 5B is a graph showing a transmittance as a function of a viewing angle according to a phase retardation value.

FIG. 5A is a graph showing a transmittance as a function of a viewing angle and FIG. 5B is a graph showing a transmittance as a function of a viewing angle according to a phase retardation value.

In FIG. 5A, a dark area represents the transmittance that is relatively low and a bright area represents the transmittance that is relatively high.

Referring to FIG. 5A, the optical axis OX of the phase retardation layer 520 applied to the viewing angle control film 500 has the azimuth angle Φ of about 90 degrees with respect to the second transmission axis TA2 of the second polarizer 420. In addition, the poloidal angle θ of the optical axis OX is about 60 degrees and the phase retardation value Δnd is about 520 nm.

In this case, the left and right side viewing angles of the liquid crystal display panel 350 is more reduced than the upper and lower side viewing angles of the liquid crystal display panel 350.

Referring to FIG. 5B, the phase retardation value Δnd of a first graph G1 is about 238 nm, the phase retardation value Δnd of a second graph G2 is about 286 nm, the phase retardation value Δnd of a third graph G3 is about 334 nm, the phase retardation value Δnd of a fourth graph G4 is about 381 nm, the phase retardation value Δnd of a fifth graph G5 is about 429 nm, the phase retardation value Δnd of a sixth graph G6 is about 524 nm, the phase retardation value Δnd of a seventh graph G7 is about 572 nm, and the phase retardation value Δnd of an eighth graph G8 is about 620 nm.

The reduction rate of the transmittance in each viewing angle varies depending on the phase retardation value Δnd. For example, when the phase retardation value Δnd decreases, the reduction rate of the transmittance in each viewing angle is gradually decreased, but when the phase retardation value Δnd increases, the reduction rate of the transmittance in each viewing angle is rapidly increased. According to exemplary embodiments of the present invention, the phase retardation value Δnd of the phase retardation layer 520 is set within a range of about 300 nm to about 1000 nm, and thus the transmittance is blocked at the side viewing angle of about 40 degrees or more.

Figure 6:
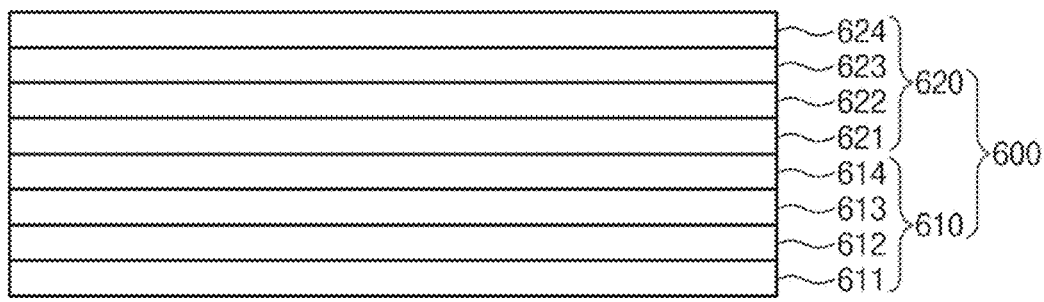
FIG. 6 is a cross-sectional view showing a stacked film according to an exemplary embodiment of the present disclosure.

FIG. 6 is a cross-sectional view showing a stacked film 600 according to an exemplary embodiment of the present disclosure.

Referring to FIG. 6, the stacked film 600 includes a polarizing part 610 and a viewing angle control part 620. The stacked film 600 is disposed on the liquid crystal display panel 350, for example, as shown in FIG. 1, and is obtained by integrally forming the viewing angle control film 500 and the second polarizer 420, which are shown in FIG. 1.

The polarizing part 610 is disposed on the liquid crystal display panel 350 and includes a first support layer 611, a compensation layer 612, a first polarizer 613, and a protection layer 614. The first support layer 611 includes the cellulose-based polymer, e.g., a triacetate cellulose (TAC).

The compensation layer 612 is disposed on the first support layer 611 and may be, but is not limited to being, a phase retardation film that compensates for a variation in phase of the light transmitting through the liquid crystal display panel 350 in an opposite direction to that of the variation in phase. The compensation layer 612 may include various compensation films. For example, when the liquid crystal is the twisted nematic mode liquid crystal, a C-plate, which has the same refractive index on the same plane surface but has different refractive index in a direction vertical to the plane surface (Nx=Ny>Nz or Nz>Nx=Ny), may be used as the compensation layer 612. When the liquid crystal is the vertical alignment mode liquid crystal, the C-plate and an A-plate, which has different refractive index on the same plane surface but has the same refractive index as that of x- and y-axes of the plane surface in the direction vertical to the plane surface (Nx=Nz>Ny or Ny=Nz>Nx), may be used as the compensation layer 612.

The first polarizer 613 is disposed on or under the compensation layer 612. FIG. 6 shows the first polarizer 613 disposed on the compensation layer 612. The first polarizer 613 polarizes the light incident thereto and exits the polarized light. For example, the first polarizer 613 converts the non-polarized light that vibrates in various directions to the light that vibrates in one direction. The first polarizer 613 includes polyvinyl alcohol (PVA) and a dichroic material distributed in the polyvinyl alcohol to polarize the light in a specific direction. In this case, the absorbing axis of the first polarizer 613 is determined depending on arrangement and size of the dichroic material distributed in the polyvinyl alcohol.

The protection layer 614 is disposed on the first polarizer 613. The protection layer 614 includes a moisture-proof agent to prevent moisture from entering the first polarizer 613.

The viewing angle control part 620 is disposed on the polarizing part 610. The viewing angle control part 620 includes a second support layer 621, a second polarizer 622, a phase retardation layer 623, and a surface treatment layer 624. The viewing angle control part 620 may have substantially the same structure and function as those of the viewing angle control film 500 shown in FIG. 2, and thus detailed description of the viewing angle control part 620 will be omitted.

However, the viewing angle control part 620 is formed by sequentially stacking the above-mentioned layers on the protection layer 614, and thus the viewing angle control part 620 may be integrated with the polarizing part 610.

Although the exemplary embodiments of the present invention have been described, it is understood that the present invention should not be limited to these exemplary embodiments but various changes and modifications can be made by one ordinary skilled in the art within the spirit and scope of the present invention.

What is claimed is:

1. A liquid crystal display comprising:
    a liquid crystal display panel comprising a first substrate and a second substrate;
    an upper polarizer disposed on an outer surface of the first substrate; and
    a viewing angle control film disposed on the upper polarizer and comprising a polarizing layer having a transmission axis substantially parallel to a transmission axis of the upper polarizer and having a phase retardation layer comprising a birefringence material having an optical axis with a poloidal angle of about 40 degrees to about 75 degrees,
    wherein the phase retardation layer is an O-plate comprising the birefringence material in which the poloidal angle of the optical axis is inclined with respect to a plane surface of the polarizing layer.
2. The liquid crystal display of claim 1, wherein the optical axis has an azimuth angle of about 0 degrees to about 90 degrees with respect to the transmission axis of the upper polarizer.

3. The liquid crystal display of claim 1, wherein the phase retardation layer has a phase retardation value of about 350 nm to about 1000 nm.

4. The liquid crystal display of claim 1, wherein the phase retardation layer is interposed between the upper polarizer and the polarizing layer.

5. The liquid crystal display of claim 4, wherein the viewing angle control film further comprises:
a support layer interposed between the phase retardation layer and the upper polarizer; and
a surface treatment layer disposed on the polarizing layer.

6. The liquid crystal display of claim 1, further comprising a lower polarizer disposed on an outer surface of the second substrate and having a transmission axis substantially vertical to the transmission axis of the upper polarizer.

7. A liquid crystal display comprising:
a liquid crystal display panel comprising a first substrate and a second substrate; and
a stacked film disposed on an outer surface of the first substrate, the stacked film comprising:
a first polarizer;
a phase retardation layer disposed on the first polarizer and comprising a birefringence material having an optical axis with a poloidal angle of about 40 degrees to about 75 degrees; and
a second polarizer disposed on the phase retardation layer and having a transmission axis substantially parallel to a transmission axis of the first polarizer,
wherein the phase retardation layer is an O-plate comprising the birefringence material in which the polopidal angle of the optical axis is inclined with respect to a plane surface of the first polarizer.

8. The liquid crystal display of claim 7, wherein the optical axis has an azimuth angle of about 0 degrees to about 90 degrees with respect to the transmission axis of the first polarizer.

9. The liquid crystal display of claim 7, wherein the phase retardation layer has a phase retardation value of about 350 nm to about 1000 nm.

10. The liquid crystal display of claim 7, wherein the stacked film further comprises:
a first support layer disposed on the first substrate;
a compensation layer disposed between the first support layer and the first polarizer; and
a protection layer that covers the first polarizer.

11. The liquid crystal display of claim 10, wherein the stacked film further comprises:
a second support layer disposed between the protection layer and the phase retardation layer; and
a surface treatment layer disposed on the second polarizer.

12. A liquid crystal display device comprising:
a lower polarizer;
a liquid crystal display panel disposed on the lower polarizer, the liquid crystal display panel comprising a first substrate, a second substrate, and a liquid crystal layer disposed therebetween;
an upper polarizer disposed on the liquid crystal display panel; and.
a viewing angle control film disposed on the upper polarizer, the viewing angle control film configured to change an optical axis of light passing through the lower polarizer, the liquid crystal display panel, and the upper polarizer, in said order,
wherein the viewing angle control film includes an O-plate comprising the birefringence material in which the poloidal angle of the optical axis is inclined with respect to a plane surface of the upper polarizer, and
wherein the viewing angle control film comprises a polarizing layer having a transmission axis substantially parallel to a transmission axis of the upper polarizer.

13. The liquid crystal display device of claim 12, wherein the poloidal angle of the optical axis is within a range of 30 degrees to 85 degrees.

14. The liquid crystal display device of claim 12, wherein the poloidal angle of the optical axis is within a range of 40 degrees to 75 degrees.

15. The liquid crystal display device of claim 12, wherein the poloidal angle of the optical axis is within a range of 50 degrees to 65 degrees.

16. The liquid crystal display device of claim 12, wherein the viewing angle control film includes a polarizing layer.

17. The liquid crystal display device of claim 16, wherein the O-plate is interposed between the upper polarizer and the polarizing layer.

18. The liquid crystal display device of claim 12, wherein the optical axis has an azimuth angle within a range of 0 degrees to 90 degrees with respect to the transmission axis of the upper polarizer.

* * * * *